(12) United States Patent
Nishino

(10) Patent No.: US 10,913,505 B2
(45) Date of Patent: Feb. 9, 2021

(54) NOTIFICATION SYSTEM

(71) Applicant: Shimano Inc., Osaka (JP)

(72) Inventor: Takafumi Nishino, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/563,383

(22) Filed: Sep. 6, 2019

(65) Prior Publication Data

US 2019/0389524 A1 Dec. 26, 2019

Related U.S. Application Data

(62) Division of application No. 16/189,874, filed on Nov. 13, 2018, now Pat. No. 10,442,486.

(30) Foreign Application Priority Data

Dec. 18, 2017 (JP) .................................. 2017-242146

(51) Int. Cl.
| | |
|---|---|
| *B62J 6/015* | (2020.01) |
| *B62J 3/00* | (2020.01) |
| *B62M 1/00* | (2010.01) |
| *B62J 50/21* | (2020.01) |

(52) U.S. Cl.
CPC .................. *B62J 6/015* (2020.02); *B62J 3/00* (2013.01); *B62M 1/00* (2013.01); *B62J 50/225* (2020.02)

(58) Field of Classification Search
CPC .................................... B62M 1/00; B62K 1/00
See application file for complete search history.

(56) References Cited

U.S. PATENT DOCUMENTS

| | | | | |
|---|---|---|---|---|
| 5,545,982 | A | * | 8/1996 | Vlakancic ................. B62L 1/12 |
| | | | | 188/24.22 |
| 2008/0236269 | A1 | * | 10/2008 | Howell ................. B60T 17/221 |
| | | | | 73/121 |
| 2012/0316710 | A1 | * | 12/2012 | Saida ....................... B62M 6/45 |
| | | | | 701/22 |
| 2013/0123070 | A1 | * | 5/2013 | Baatz ................. A63B 24/0062 |
| | | | | 482/8 |
| 2013/0333994 | A1 | * | 12/2013 | Jordan .................... B62L 3/023 |
| | | | | 188/344 |
| 2014/0015659 | A1 | * | 1/2014 | Tetsuka .................. B62M 9/122 |
| | | | | 340/432 |
| 2015/0106996 | A1 | * | 4/2015 | Lau ...................... B60Q 1/2673 |
| | | | | 2/160 |
| 2015/0129371 | A1 | * | 5/2015 | Gutelius ................. F16D 65/14 |
| | | | | 188/72.6 |

(Continued)

FOREIGN PATENT DOCUMENTS

| | | |
|---|---|---|
| CN | 202429321 U | 9/2012 |
| DE | 10 2006 036 415 A1 | 2/2008 |

(Continued)

*Primary Examiner* — Shirley Lu
(74) *Attorney, Agent, or Firm* — Global IP Counselors, LLP

(57) ABSTRACT

A notification system notifies brake-related information related to braking of a rotation body of a human-powered vehicle. The notification system includes a notification unit that includes a notification device configured to notify a user of the brake-related information. The notification device is provided on at least one of a brake device braking the rotation body, an operation device operating the brake device, and a display device.

19 Claims, 3 Drawing Sheets

(56) References Cited

U.S. PATENT DOCUMENTS

2016/0375347 A1* 12/2016 Stubberud .......... A63C 17/0006
　　　　　　　　　　　　　　　　　　　　701/79
2017/0217511 A1* 8/2017 Orlovskiy ................ B62K 1/00

FOREIGN PATENT DOCUMENTS

| DE | 10 2016 107 655 A1 | 11/2016 |
| JP | 2017-30395 A | 2/2017 |
| JP | 2017-175608 A | 9/2017 |

\* cited by examiner

NOTIFICATION SYSTEM

CROSS-REFERENCE TO RELATED APPLICATIONS

This application is a divisional application of U.S. patent application Ser. No. 16/189,874, which was filed on Nov. 13, 2018. This application claims priority to Japanese Patent Application No. 2017-242146, filed on Dec. 18, 2017. The entire disclosures of Japanese Patent Application No. 2017-242146 and U.S. patent application Ser. No. 16/189,874 are hereby incorporated herein by reference.

BACKGROUND

Technical Field

The present disclosure generally relates to a notification system.

Background Information

Japanese Laid-Open Patent Publication No. 2017-30395 (Patent document) 1 describes an example of a notification system applied to a human-powered vehicle. The notification system includes a notification unit includes a display device for notifying at least one of a riding state and a riding environment of the human-powered vehicle. The notification unit includes a display provided in the display device. A user that rides the human-powered vehicle views information shown on the display to recognize at least one of the riding state and the riding information.

SUMMARY

It is desirable that the user recognize brake-related information related to braking of a rotation body of the human-driven vehicle so that the user can comfortably ride the human-powered vehicle. One object of the present disclosure is to provide a notification system that allows the user to comfortably ride a human-powered vehicle.

A notification system in accordance with a first aspect of the present disclosure notifies brake-related information related to braking of a rotation body of a human-powered vehicle. The notification system comprises a notification unit that includes a notification device configured to notify a user of the brake-related information. The notification device is provided on at least one of a brake device braking the rotation body, an operation device operating the brake device, and a display device. With the notification system in accordance with the first aspect, the notification unit is configured to notify the user of the brake-related information. Thus, the user can comfortably ride the human-powered vehicle.

In accordance with a second aspect of the present disclosure, the notification system according to the first aspect is configured so that the operation device includes a base member coupled to the human-powered vehicle, and an operation member provided on the base member to be manually operated. The notification unit is provided on at least one of the base member and the operation member. With the notification system in accordance with the second aspect, in a state in which the user is riding the human-powered vehicle, the operation device serves as a user interface and allows the user to be easily notified of the brake related information.

In accordance with a third aspect of the present disclosure, the notification system according to the second aspect is configured so that the notification unit is provided on the base member. With the notification system in accordance with the third aspect, the notification unit is provided on the base member at a location where the user can easily view and touch the notification unit. Thus, the user is easily notified of the brake-related information.

In accordance with a fourth aspect of the present disclosure, the notification system according to one of the first to third aspects is configured so that the brake device includes a friction member that is configured to be in contact with the rotation body, and a main body holding the friction member. The notification unit is provided on the main body. With the notification system in accordance with the fourth aspect, the notification unit is provided on the main body where the main body is unlikely to be covered by various elements of the human-powered vehicle. Thus, the user is easily notified of the brake-related information when performing maintenance on the human-powered vehicle.

In accordance with a fifth aspect of the present disclosure, the notification system according to the fourth aspect is configured so that the rotation body includes a disc brake rotor rotating integrally with a wheel of the human-powered vehicle. The main body is configured to move the friction member toward and away from the disc brake rotor. With the notification system in accordance with the fifth aspect the user is notified of brake-related information related to a disc brake type brake system. Thus, the user can comfortably ride the human-powered vehicle.

In accordance with a sixth aspect of the present disclosure, the notification system according to any one of the first to fifth aspects is configured so that the notification unit is provided on the display device. With the notification system in accordance with the sixth aspect, in a state in which the user is riding the human-powered vehicle, the display device serves as a user interface and allows the user to be easily notified of the brake related information.

In accordance with a seventh aspect of the present disclosure, the notification system according to the sixth aspect is configured so that the notification device includes a display provided on the display device. With the notification system in accordance with the seventh aspect, the brake-related information is shown on the display. Thus, the user is easily notified of the brake-related information.

In accordance with an eighth aspect of the present disclosure, in the notification system according to the seventh aspect, the display device is configured to show information related to traveling of the human-powered vehicle on the display. With the notification system in accordance with the eighth aspect, the user is stably notified of the brake-related information by showing the brake-related information together with information related to traveling of the human-powered vehicle that is relatively often checked.

In accordance with a ninth aspect of the present disclosure, the notification system according to any one of the first to eighth aspect is configured so that the notification device includes a light emitting element that is configured to notify the brake-related information with a lighting state. With the notification system in accordance with the ninth aspect, the user is easily notified of the brake-related information with the lighting state of the light emitting element.

In accordance with a tenth aspect of the present disclosure, the notification system according to any one of the first to ninth aspects is configured so that the notification device includes a speaker that is configured to notify the brake-related information with sound. With the notification system in accordance with the tenth aspect, the user is easily notified of the brake-related information with sound from the speaker.

In accordance with an eleventh aspect of the present disclosure, the notification system according to any one of the first to tenth aspects is configured so that the notification device includes a vibration element that is configured to notify the brake-related information with vibration. With the notification system in accordance with the eleventh aspect, the user is easily notified of the brake-related information with vibration of the vibration element.

In accordance with a twelfth aspect of the present disclosure, the notification system according to any one of the first to eleventh aspects is configured so that the brake-related information includes information related to a braking force applied to the rotation body. With the notification system in accordance with the twelfth aspect, information related to the braking force is notified. This allows a braking operation to be performed in a preferred manner.

In accordance with a thirteenth aspect of the present disclosure, the notification system according to any one of the first to twelfth aspects is configured so that the brake-related information includes information related to a usage state of at least one of the rotation body, the brake device, and the operation device. With the notification system in accordance with the thirteenth aspect, information related to the usage state is notified to maintain the brake system in a suitable state.

In accordance with a fourteenth aspect of the present disclosure, the notification system according to the thirteenth aspect is configured so that the brake device includes a friction member being in contact with the rotation body. The information related to the usage state includes information related to a thickness of at least one of the rotation body and the friction member. With the notification system in accordance with the fourteenth aspect, the time for replacing or servicing at least one of the rotation body and the friction member can be notified.

In accordance with a fifteenth aspect of the present disclosure, the notification system according to any one of the first to fourteenth aspects further comprises an electric drive unit configured to drive the brake device to brake the rotation body with a friction member. With the notification system in accordance with the fifteenth aspect, the diving of the electric drive unit or the drive assistance of the electric drive unit allows for easy braking of the rotatable body.

In accordance with a sixteenth aspect of the present disclosure, the notification system according to the fifteenth aspect is configured so that the brake-related information includes information related to an actuation state of the electric drive unit. With the notification system in accordance with the sixteenth aspect, the information related to the actuation state of the electric drive unit allows a braking operation to be performed in a preferred manner.

In accordance with a seventeenth aspect of the present disclosure, the notification system according to the fifteenth or sixteenth aspect further includes an electronic controller that is configured to control the electric drive unit. The brake-related information includes information related to a control mode in which the electronic controller is configured to control the electric drive unit. With the notification system in accordance with the seventeenth aspect, the controller notifies the user of the control mode that is being executed.

In accordance with an eighteenth aspect of the present disclosure, the notification system according to the seventeenth aspect is configured so that the control mode includes an adjustment mode for adjusting a clearance between the rotation body and the friction member. With the notification system in accordance with the eighteenth aspect, the user is notified of the adjustment mode that is being executed.

In accordance with a nineteenth aspect of the present disclosure, the notification system according to the seventeenth or eighteenth aspect is configured so that the control mode includes an automatic mode for automatically controlling the electric drive unit. With the notification system in accordance with the nineteenth aspect, the user is notified of the automatic mode that is being executed.

In accordance with a twentieth aspect of the present disclosure, the notification system according to any one of the fifteenth to nineteenth aspects further includes an electric power supply configured to supply electric power to the electric drive unit. The brake-related information includes information related to electric power of the electric power supply. With the notification system in accordance with the twentieth aspect, the user is notified of the battery level or the like of the electric power supply.

The notification system in accordance with the present disclosure allows a user to comfortably ride the human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
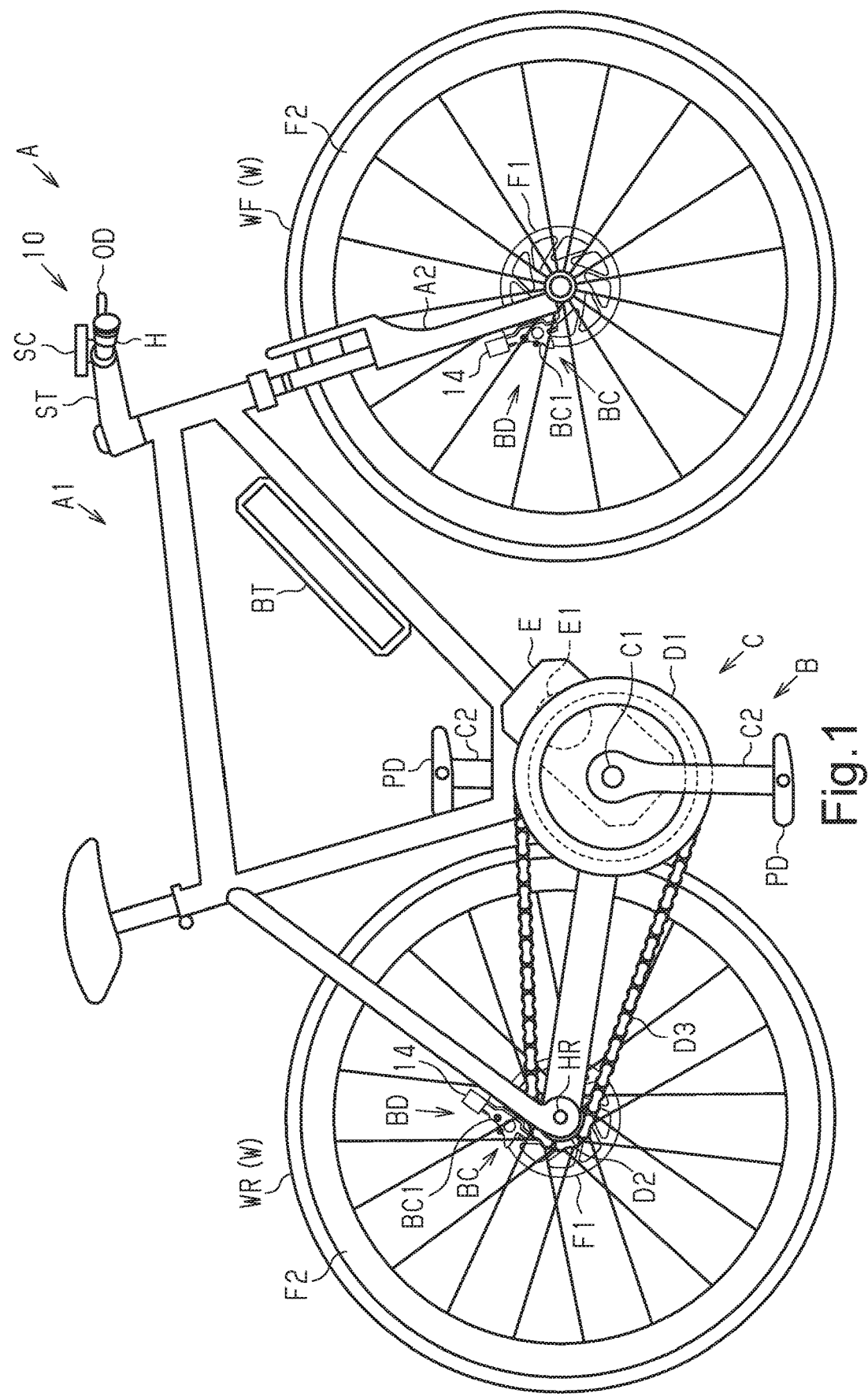
FIG. 1 is a side elevational view of a human-powered vehicle including a notification system in accordance with a first embodiment.

A human-powered vehicle A including a notification system 10 will now be described with reference to FIG. 1. Human-powered vehicles refer to vehicles that at least partially use human power as a driving force for propulsion and include vehicles that assist human power with electric motors. Human-powered vehicles do not include vehicles using driving forces other than human power. In particular, human-powered vehicles do not include vehicles that solely use internal combustion engines for driving force. A typical human-powered vehicle is a small and light vehicle that does not require a license for driving on a public road. The illustrated human-powered vehicle A is a bicycle (e-bike) including an assist device C that uses electric energy to assist propulsion of the human-powered vehicle A. More specifically, the illustrated human-powered vehicle A is a trekking bike. The human-powered vehicle A further includes a frame A1, a front fork A2, a pair of wheels W, a handlebar H, and a drive train B. The wheels W include a front wheel WF and a rear wheel WR.

The drive train B is of a chain-drive type. The drive train B includes a crank C, a front sprocket D1, a rear sprocket D2, and a chain D3. The crank C includes a crankshaft 1 rotatably supported by the frame A1 and two crank arms C2 each provided on one of the two ends of the crankshaft 1. A pedal PD is rotatably coupled to the distal end of each of the crank arms C2. The drive train B can be of any type such as a belt-drive type or a shaft-drive type.

The front sprocket D1 is provided on the crank C to rotate integrally with the crankshaft 1. The rear sprocket D2 is provided on a hub HR of the rear wheel WR. The chain D3 is wound around the front sprocket D1 and the rear sprocket D2. Driving force applied to the pedals PD by a rider riding the human-powered vehicle A is transmitted via the front sprocket D1, the chain D3, and the rear sprocket D2 to the rear wheel WR.

The human-powered vehicle A further includes an electric assist unit E. The electric assist unit E functions to assist propulsion of the human-powered vehicle A. The electric assist unit E functions in accordance with, for example, the drive force applied to the pedals PD. The electric assist unit E includes an electric motor μl. The electric assist unit E is driven by electric power supplied from a battery BT mounted on the human-powered vehicle A. The electric assist unit E may be omitted from the human-powered vehicle A.

The human-powered vehicle A further includes brake devices BD, the number of which corresponds to the number of the wheels W. In the present embodiment, the human-powered vehicle A is provided with the brake device BD that corresponds to the front wheel WF and the brake device BD that corresponds to the rear wheel WR. The two brake devices BD have the same construction. In the present embodiment, the brake devices BD are disc brake devices that brake rotation bodies of the human-powered vehicle A. The rotation bodies include disc brake rotors F1 (hereafter referred to as "the rotation bodies F1") rotating integrally with the wheels W of the human-powered vehicle A. The rotation bodies F1 are respectively provided on the front wheel WF and the rear wheel WR of the human-powered vehicle A.

Each of the brake devices BD includes a friction member BP (refer to FIG. 3) in contact with the corresponding rotation body F1 and a main body BC holding the friction member BP. The friction member BP includes a pair of friction members BP coupled to the main body BC to sandwich the corresponding rotation body F1 in between. The main body BC is configured to move the friction members BP toward and away from the disc brake rotor F1. In the present embodiment, the main body BC is a caliper that sandwiches the rotation body F1 with the friction members BP. The main body BC includes a housing BC1 and two pistons (not shown). One of the pistons is coupled to one of the friction members BP, and the other one of the pistons is coupled to the other one of the friction members BP. The main body BC is driven to move the two pistons toward each other so that the two friction members BP contact the corresponding rotation body F1 with the rotation body F1 sandwiched in between. As a result, the brake device BD brakes the rotation body F1. In each brake devices BD, one of the two pistons and one of the two friction members BP can be omitted. That is, the brake can be applied to the rotation body F1 by only one of the friction members BP.

The human-powered vehicle A further includes a display device SC. The display device SC is provided on the handlebar H, a stem ST, or the like. In the present embodiment, the display device SC is a cycle computer provided on the handlebar H. The display device SC is configured to show traveling-related information of the human-powered vehicle A. Traveling-related information of the human-powered vehicle A is obtained through, for example, various types of sensors (not shown) mounted on the human-powered vehicle A.

The human-powered vehicle A further includes operation devices OD. With respect to a center plane of the human-powered vehicle A, one of the operation devices OD is provided on the right side of the handlebar H and the other one of the operation devices OD is provided on the left side of the handlebar H. One of the brake devices BD is driven in accordance with the operation of one of the operation devices OD, and the other one of the brake devices BD is driven in accordance with the operation of the other one of the operation devices OD.

Figure 2:
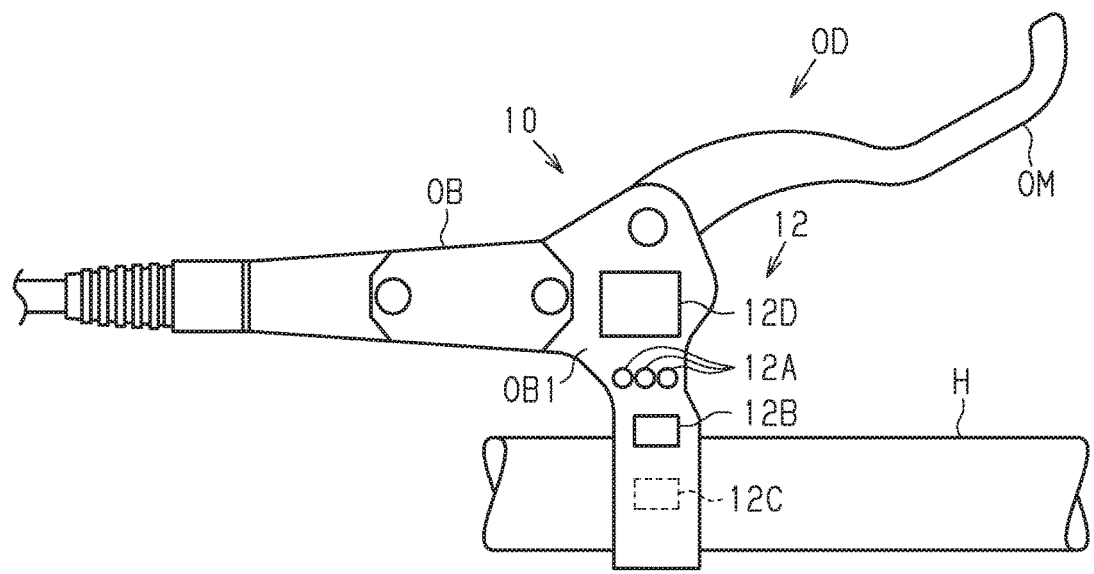
FIG. 2 is a schematic diagram of an operation device shown in FIG. 1.

FIG. 2 shows the operation device OD provided on the right side of the handlebar H. The operation device OD includes a base member OB coupled to the human-powered vehicle A, and an operation member OM provided on the base member OB to be manually operated. The base member OB is, for example, coupled to the handlebar H. The operation member OM includes a lever manually operated by a user or the like. The lever is coupled to the base member OB so as to be rotatable to the base member OB.

The notification system 10 notifies brake-related information related to braking of the rotation bodies F1 of the human-powered vehicle A. The notification system 10 includes a notification unit 12 that is configured to notify a user of the brake-related information on at least one of the brake devices BD braking the rotation bodies F1, the operation devices OD operating the brake devices BD, and the display device SC. The notification unit 12 is provided on, for example, the operation device OD. The notification unit 12 is provided on at least one of the base member OB and the operation member OM. In the present embodiment, the notification unit 12 is provided on the base member OB. Instead of or in addition to the operation device OD provided on the right side of the handlebar H, the notification unit 12 may be provided on the operation device OD provided on the left side of the handlebar H. The notification system 10 can be recognized as a brake system including the brake devices BD and the operation devices OD. The brake device can include the display device SC. In the brake system, an electric drive unit 14, an electronic controller 16, and an electric power supply BT (all described later) can be recognized as at least one element of the brake devices BD and the operation devices OD. The term "electronic controller" as used herein refers to hardware that executes a software program. The electronic controller 16 will hereafter be referred to simply as the controller 16.

The notification unit 12 includes a light emitting element 12A, a speaker 12B, a vibration element 12C, and a display 12D. The light emitting element 12A, the speaker 12B, the vibration element 12C, and the display 12D are examples of notification devices that notifies the brake-related information to a rider. The term "notification device" as used herein does not include a person. The light emitting element 12A notifies the brake-related information with a lighting state. The light emitting element 12A includes one or more light emitting elements 12A. The light emitting element 12A is, for example, a light emitting diode (LED) lamp. In the present embodiment, a plurality of light emitting elements 12A are provided on an outer surface OB1 of the base member OB. The lighting state of the light emitting elements 12A include the type (color), number, lighting patterns, and the like of the light emitting elements 12A that are lighted. The lighting patterns include continuous lighting, intermittent lighting, and the like of the light emitting elements 12A. Intermittent lighting includes lighting patterns in which the intermittent lighting time is varied, and the color is changed during lighting. The user views the lighting state of the light emitting elements 12A to recognize the lighting state.

The speaker 12B notifies the brake-related information with sound. In the present embodiment, the speaker 12B is provided on the outer surface OB1 of the base member OB. The sound output from the speaker 12B includes a voice, a melody, a beep, and the like. The user listens to the sound from the speaker 12B to recognize the brake-related information.

The vibration element 12C notifies the brake-related information with vibration. In the present embodiment, the vibration element 12C is provided inside the base member OB. The vibration output from the vibration element 12C includes a plurality of vibration patterns. The vibration output from the vibration element 12C is transmitted to the handlebar H, the operation member OM, and the like that are gripped by the user. The user feels the vibration output from the vibration element 12C to recognize the brake-related information.

The display 12D notifies the brake-related information by showing characters, numbers, symbols, patterns, images, icons, and the like. In the present embodiment, the display 12D is provided on the outer surface OB1 of the base member OB. The user views the information shown on the display 12D to recognize the brake-related information.

Figure 3:
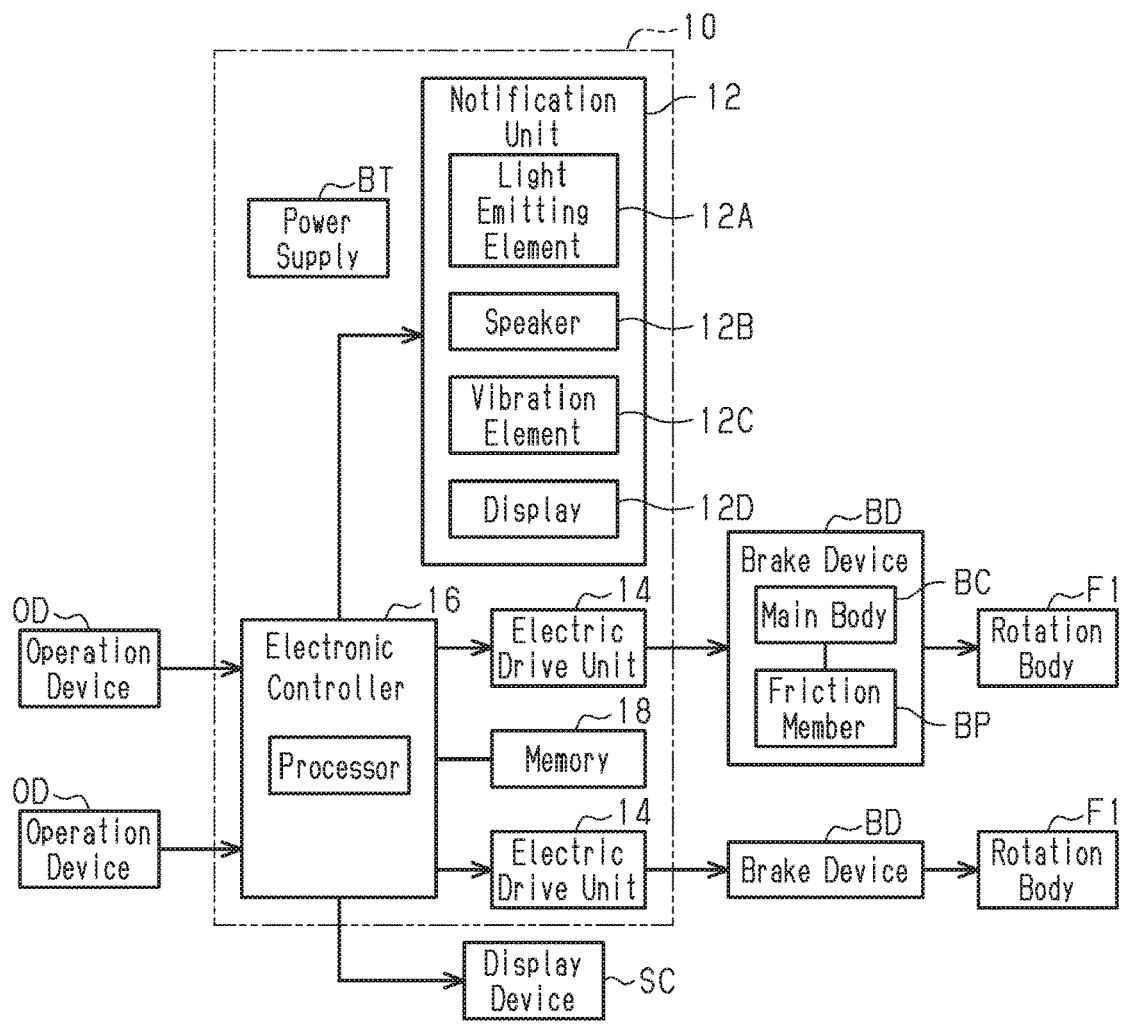
FIG. 3 is a block diagram showing the connection relationship of the notification system of FIG. 1 and various elements.

As shown in FIG. 3, the notification system 10 further includes the electric drive unit 14 that drives the brake device BD to brake a rotation body F1 with the friction members BP. The electric drive unit 14 includes a plurality of electric drive units 14 each driving one of the brake devices BD. In the present embodiment, the electric drive units 14 include the electric drive unit 14 that drives one of the brake devices BD and the electric drive unit 14 that drives the other one of the brake devices BD. The electric drive unit 14 is, for example, an electric motor. The electric drive unit 14 is not limited to an electric motor and may be a solenoid or the like as long as it is electrically driven. In the present embodiment, the electric drive unit 14 is provided in a housing of the main body BC. The electric drive unit 14 is driven to electrically drive the main body BC and sandwich the corresponding rotation body F1 with the pair of friction members BP to brake the rotation body F1. The electric drive unit 14 may be provided separately from the main body BC. More specifically, the electric drive unit 14 may be provided at any location such as on the frame A1, the front fork A2, or the handlebar H.

The notification system 10 further includes an electric power supply supplying electric power to the electric drive unit 14. The electric power supply is the battery BT (hereafter referred to as "the electric power supply BT") mounted on the human-powered vehicle A. The electric drive unit 14 is driven by electric power supplied from, for example, the electric power supply BT. The electric power supply can be an electric power supply that differs from the battery BT. In this case, the electric power supply can be provided on the frame A1 of the human-powered vehicle A to supply electric power to each of the brake devices BD. Alternatively, a separate electric power supply can be provided for each of the brake devices BD to separately supply electric power to the corresponding brake device BD.

The notification system 10 further includes the controller 16 to control the electric drive unit 14. The controller 16 is a central processing unit (CPU) or a micro-processing unit (MPU) that includes one or more processors. The controller 16 controls one of the electric drive units 14 in accordance with operation of one of the operation devices OD to actuate one of the brake devices BD. Further, the controller 16 controls the other one of the electric drive units 14 in accordance with operation of the other one of the operation devices OD to actuate the other one of the brake devices BD. The controller 16 can control each electric drive unit 14 in accordance with operation of each of the two operation devices OD to actuate each of the brake devices BD (in the present embodiment, two brake devices BD). In this case, the ratio of the braking forces of the brake devices BD produced by one of the operation devices OD may differ from the ratio of the braking forces of the brake devices BD produced by the other one of the operation devices OD.

The controller 16 controls each of the electric drive units 14 to adjust braking force applied to the rotation bodies F1 based on the relative rotational speed of the front wheel WF and the rear wheel WR. More specifically, in a case where the rotational speed of one of the front wheel WF and the rear wheel WR is slower by a predetermined speed than the rotational speed of the other one of the front wheel WF and the rear wheel WR, the controller 16 controls each electric drive unit 14 to temporarily (intermittently) brake one of the front wheel WF and the rear wheel WR. That is, the controller 16 controls each electric drive unit 14 to configure an antilock brake system (ABS). Such ABS control may be executed on the front wheel WF based on the rotational speed of the front wheel WF and the travel speed (vehicle body speed) of the human-powered vehicle A and executed on the rear wheel WR based on the rotational speed of the rear wheel WR and the travel speed of the human-powered vehicle A.

The notification system 10 includes a memory 18. The memory 18 includes a non-volatile memory and a volatile memory. The memory device 18 is any computer storage device or any computer readable medium with the sole exception of a transitory, propagating signal. The memory 18 stores, for example, various control programs and preset information. The information stored in advance in the memory 18 can be configured to be changeable by a predetermined input device (not shown). The controller 16 deploys and executes the programs in the memory 18 to execute various controls on the brake devices BD.

The memory 18 stores, for example, a control mode related to the control of the electric drive units 14 executed by the controller 16. The control mode includes at least one of an adjustment mode and an automatic mode. The adjustment mode is a control mode for adjusting the clearance between the rotation body F1 and the friction members BP. The automatic mode is a control mode for automatically controlling the electric drive unit 14. Any control mode of the controller 16 can be selected in accordance with, for example, operation of a predetermined operation device (not shown). In the adjustment mode, the controller 16 controls the electric drive unit 14 to adjust the clearance between the rotation body F1 and the friction members BP in accordance with the operation of the predetermined operation device. In the automatic mode, the controller 16 controls the electric drive unit 14 to automatically actuate the brake devices BD in accordance with, for example, the travel speed of the human-powered vehicle A, the tilt angle of the human-powered vehicle A in the front-rear direction, the rotational speed of the crank C, and the like. More specifically, the electric drive units 14 are controlled to automatically perform braking with the brake devices BD in a state in which the travel speed of the human-powered vehicle A exceeds an upper limit value under a predetermined condition.

The controller 16 obtains brake-related information from, for example, various elements of the human-powered vehicle A and various detectors (not shown) mounted on the human-powered vehicle A. Then, the controller 16 notifies the notification unit 12 of the obtained brake-related information. The brake-related information includes at least one of the information described below in first to seventh examples.

In a first example, the brake-related information includes information related to the braking state of the brake devices BD. Information related to the braking state includes information related to whether or not the brake devices BD are braking the rotation bodies F1 and the like. In a case where the notification unit notifies the brake-related information to the outside instead of the user, the brake-related information of the first example does not include whether or not the rotation bodies F1 are being braked. That is, in a case where the notification unit is provided in a brake lamp, the brake-related information does not include information related to whether or not the rotation bodies F1 are being braked. In a second example, information related to the actuation state of ABS control includes information related to ABS control and the like. Information related to the actuation state of ABS control includes information of whether or not the controller 16 is executing ABS control and the like. In a case where the notification unit is provided on the display device SC, information related to the actuation state of ABS control does not include information related to ON/OFF of ABS control.

In a third example, the brake-related information includes information related to failure of an element used to brake the rotation bodies F1. The failure-related information includes information related to the actuation state of elements used to brake the rotation bodies F1, information related whether or not a non-genuine component is being used as an element for braking the rotation bodies F1. A non-genuine component includes a non-compatible component and a component of a different standard. In the present embodiment, the brake-related information of the third example that is the failure-related information includes information related to the actuation state of the electric drive units 14. More specifically, the brake-related information of the third example includes information related to whether or not the electric drive units 14 are functioning normally. Further, the brake-related information of the third example includes information related to whether or not the electric drive units 14 are able to function normally. In a fourth example, the brake-related information includes information related to the braking force applied to the rotation bodies F1. The information related to the braking force includes information related to the force applied by the friction members BP to the rotation bodies F1 (friction force, clamping force, pressing force) information related to the operation amount of the operation devices OD, and the like.

In a fifth example, the brake-related information includes information related to the usage state of at least one of the rotation bodies F1, the brake devices BD, and the operation devices OD. The information related to the usage state includes information of a thickness of at least either one of the rotation bodies F1 and the friction members BP. In a sixth example, the brake-related information includes information related to the control mode in which the controller 16 controls the electric drive unit 14. The information related to the control mode includes information related to the type of the control mode undergoing execution and the like. In the seventh example, the brake-related information includes information related to the electric power of the electric power supply BT. The information related to the electric power of the electric power supply BT includes information related to the battery level of the electric power supply BT and the like.

Second Embodiment

Figure 4:
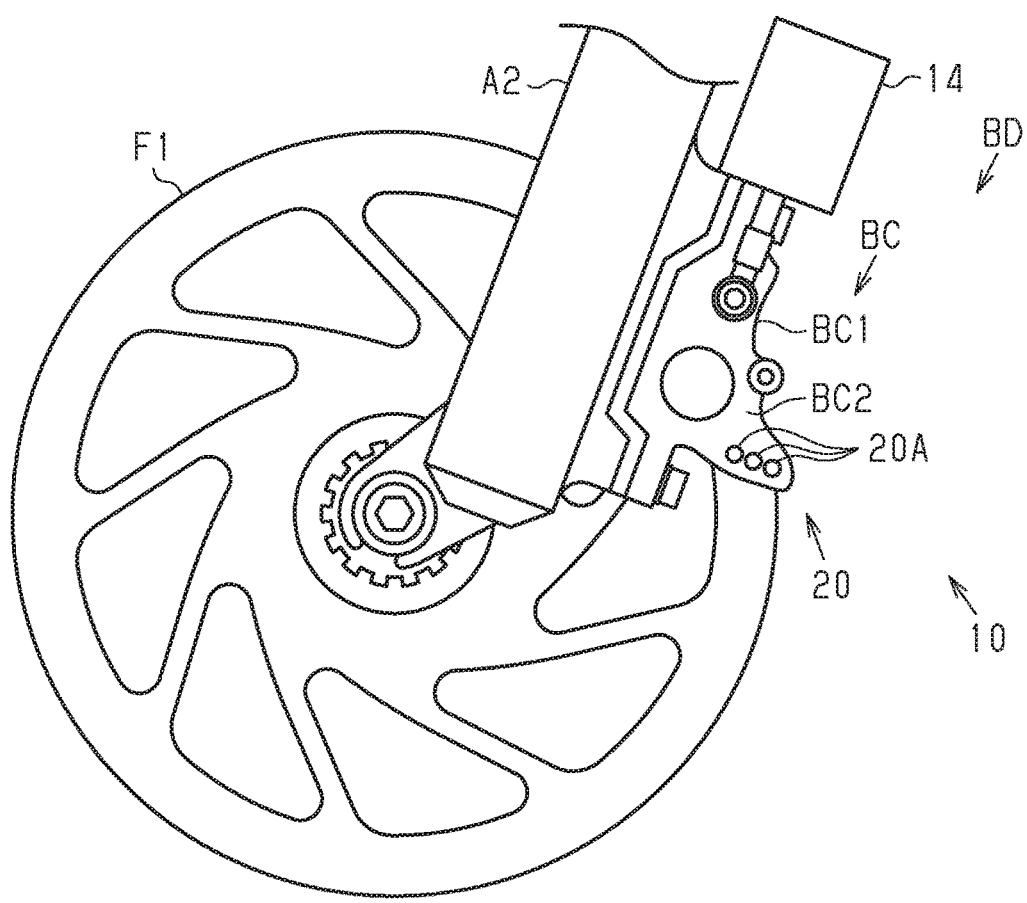
FIG. 4 is a partial side elevational view showing a braking device of a human-powered vehicle including a notification system in accordance with a second embodiment.

With reference to FIG. 4, the notification system 10 in accordance with a second embodiment will now be described. Same reference numerals are given to those components that are the same as the corresponding components of the first embodiment. Such components will not be described in detail. The description hereafter will focus on differences from the first embodiment. FIG. 4 is a left view of the human-powered vehicle A and shows the brake device BD corresponding to the front wheel WF and its surrounding.

The notification system 10 includes a notification unit 20 instead of the notification unit 12 of the first embodiment (refer to FIG. 2). The notification unit 20 has substantially the same function as the notification unit 12. More specifically, the brake-related information notified by the notification unit 20 is substantially the same as the brake-related information notified by the notification unit 12. The notification unit 20 is provided on, for example, the brake device BD. The notification unit 20 is provided on at least either one of the friction members BP and the main body BC. In the present embodiment, the notification unit 20 is provided on the main body BC.

The notification unit 20 includes a light emitting element 20A (a notification device) that notifies the brake-related information with a lighting state. The light emitting element 20A includes one or more light emitting elements 20A. The light emitting element 20A includes a light emitting diode (LED) lamp. In the present embodiment, a plurality of light emitting elements 20A are provided on an outer surface BC2 of the housing BC1 of the main body BC. The user views the lighting state of the light emitting element 20A to recognize the brake-related information. Instead of or in addition to the light emitting element 20A, the notification unit 20 can include a speaker (not shown), a vibration element (not shown), and a display (not shown).

Third Embodiment

Figure 5:
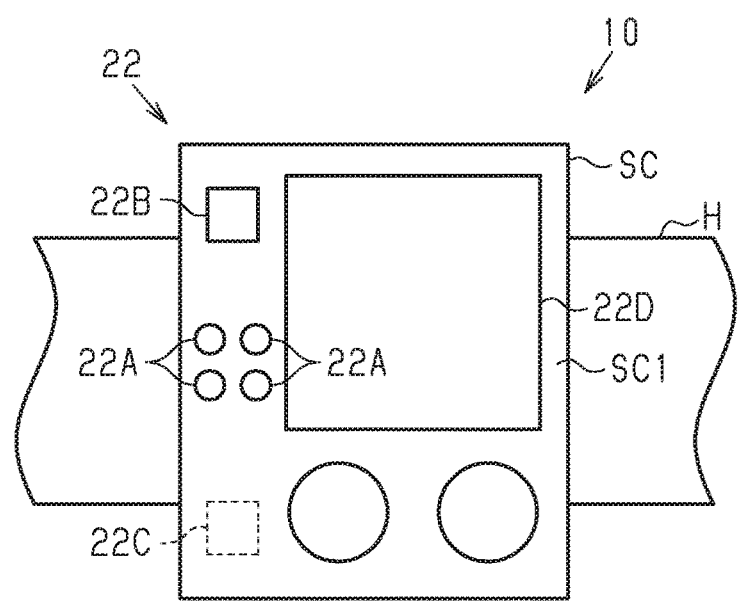
FIG. 5 is a plan view showing a display device of a notification unit of a notification system according to a third embodiment.

With reference to FIG. 5, the notification system 10 in accordance with a third embodiment will now be described. Same reference numerals are given to those components that are the same as the corresponding components of the first embodiment. Such components will not be described in detail. The description hereafter will focus on differences from the first embodiment.

The notification system 10 includes a notification unit 22 instead of the notification unit 12 of the first embodiment (refer to FIG. 2). The notification unit 22 has substantially the same function as the notification unit 12. More specifically, the brake-related information notified by the notification unit 22 is substantially the same as the brake-related information notified by the notification unit 12. In the present embodiment, the notification unit 22 is provided on the display device SC.

The notification unit 22 includes a light emitting element 22A (a notification device), a speaker 22B (a notification device), a vibration element 22C (a notification device), and a display 22D (a notification device) provided on the display device SC. The light emitting element 22A notifies the brake-related information with a lighting state. The light emitting element 22A includes one or more light emitting elements 22A. The light emitting element 22A is, for example, a light emitting diode (LED) lamp. In the present embodiment, a plurality of light emitting elements 22A are provided on an outer surface SC1 of the display device SC. The user views the lighting state of the light emitting elements 22A to recognize the brake-related information.

The speaker 22B notifies the brake-related information with sound. In the present embodiment, the speaker 22B is provided on the outer surface SC1 of the display device SC. The user listens to the sound from the speaker 22B to recognize the brake-related information. The vibration element 22C notifies the brake-related information with vibration. In the present embodiment, the vibration element 22C is provided inside the display device SC. he vibration element 22C outputs vibration that is transmitted to the handlebar H or the like gripped by the user. The user feels the vibration output from the vibration element 22C to recognize the brake-related information. The display 22D notifies the brake-related information by showing characters, numbers, symbols, patterns, images, icons, and the like. In the present embodiment, the display 22D is provided on the outer surface SC1 of the display device SC. The display 22D functions as a display of the display device SC. That is, the display device SC is configured to show information related to traveling of the human-powered vehicle A on the display 22D. The user views the information shown on the display 22D to recognize the brake-related information.

Modifications

The description related with the above embodiment exemplifies, without any intention to limit, an applicable form of a notification system according to the present disclosure. In addition to the embodiment described above, the notification system according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiment. Such components will not be described in detail.

The display device SC can be located at any location. In a first example, the display device SC is provided on the frame A1. In the second example, the display device SC is provided on the front fork A2. In a third example, the display device SC is provided on a fender (not shown) of the human-powered vehicle A.

The contents of the brake-related information can be changed. In one example, in the first embodiment and the second embodiment, the information related to the actuation state of ABS control may include information related to ON/OFF of the ABS control. More specifically, in an example in which the notification unit is provided on at least one of the operation device OD and the brake device BD, the information related to the actuation state of ABS control may include ON/OFF of ABS control.

The type of the brake device BD can be changed. In a first example, the brake devices BD are rim brake devices. In this case, the rotation bodies are rims F2 (refer to FIG. 1). In a second example, the brake devices BD are hydraulic brake devices. Each brake device BD further includes an actuator (not shown) that drives the main body BC with fluid. One example of a fluid that is a power transmission medium is hydraulic oil. The actuator is driven by the electric drive unit 14, and the pressure of the fluid is applied via the main body BC to the friction members BP. Thus, the friction members BP are in contact with the corresponding rotation body F1 and brakes the rotation body F1. In a third example, the brake devices BD are cable-type brake devices. Each of the brake devices BD further includes an actuator (not shown) that drives the main body BC with a cable. The electric drive unit 14 drives the actuator to pull a cable that moves the friction members BP. The friction members BP contact the corresponding rotation body F1 and brakes the rotation body F1. In a fourth example, the brake devices BD are regenerative brake devices. In this case, the brake devices BD include the electric motor µl of the electric assist unit E. The electric motor µl is configured to be regenerative. In the fourth example, the electric drive units 14 can be omitted from the notification system 10. In a fifth example, the brake devices BD are mechanically driven brake devices. In the fifth example, the electric drive units 14 can be omitted from the notification system 10.

The human-powered vehicle A can be of any type. In a first example, the human-powered vehicle A is a road bike, a mountain bike, a cross bike, a city cycle, a cargo bike, or a recumbent bike. In a second example, the human-powered vehicle A is a kick scooter.

In understanding the scope of the present disclosure, the phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A notification system for notifying brake-related information related to braking of a rotation body of a human-powered vehicle, the notification system comprising:
   a notification unit including a notification device that is configured to notify a rider of the human-powered vehicle of the brake-related information, the notification device being provided on at least one of a brake device and an operation device,
   the brake device having a bicycle mounting part for mounting the braking device to a bicycle, the brake device being configured to mechanically provide braking force to the rotation body,
   the operation device having another bicycle mounting part for mounting the operation device to the bicycle, the operation device being configured to mechanically operate the brake device, the operation device includes a base member coupled to the bicycle, the operation device further having an operation member provided on the base member to be manually operated,
   the notification unit being provided on at least one of the base member and the operation member.

2. The notification system according to claim 1, wherein the notification unit is provided on the base member.

3. The notification system according to claim 1, wherein the notification device includes a light emitting element that is configured to notify the brake-related information with a lighting state.

4. The notification system according to claim 1, wherein the notification device includes a speaker that is configured to notify the brake-related information with sound.

5. The notification system according to claim 1, wherein the notification device includes a vibration element that is configured to notify the brake-related information with vibration.

6. The notification system according to claim 1, wherein the brake-related information includes information related to a braking force applied to the rotation body.

7. The notification system according to claim 1, wherein the brake-related information includes information related to a usage state of at least one of the rotation body, the brake device, and the operation device.

8. The notification system according to claim 7, wherein the brake device includes a friction member being in contact with the rotation body, and
the information related to the usage state includes information related to a thickness of at least one of the rotation body and the friction member.

9. The notification system according to claim 1, further comprising
an electric drive unit configured to drive the brake device to brake the rotation body with a friction member.

10. The notification system according to claim 9, wherein the brake-related information includes information related to an actuation state of the electric drive unit.

11. The notification system according to claim 9, further comprising
an electronic controller that is configured to control the electric drive unit, wherein
the brake-related information includes information related to a control mode in which the electronic controller is configured to control the electric drive unit.

12. The notification system according to claim 11, wherein
the control mode includes an adjustment mode for adjusting a clearance between the rotation body and the friction member.

13. The notification system according to claim 11, wherein
the control mode includes an automatic mode for automatically controlling the electric drive unit.

14. The notification system according to claim 9, further comprising
an electric power supply configured to supply electric power to the electric drive unit, and
the brake-related information including information related to electric power of the electric power supply.

15. A notification system for notifying brake-related information related to braking of a rotation body of a human-powered vehicle, the notification system comprising:
an electric drive unit configured to drive a brake device to brake the rotation body with a friction member;
an electronic controller configured to control the electric drive unit; and
a notification unit including a notification device that is configured to notify a rider of the human-powered vehicle of the brake-related information, the notification device being provided on an operation device having a bicycle mounting part for mounting the operation device to the bicycle, the operation device being configured to mechanically operate the brake device, the operation device including a base member coupled to the bicycle, the operation device further having an operation member provided on the base member to be manually operated, the notification unit being provided on at least one of the base member and the operation member.

16. The notification system according to claim 15, wherein
the brake-related information includes information related to a braking force applied to the rotation body.

17. The notification system according to claim 15, wherein
the brake-related information includes information related to a usage state of at least one of the rotation body, the brake device, and the operation device.

18. The notification system according to claim 15, wherein
the information related to the usage state includes information related to a thickness of at least one of the rotation body and the friction member.

19. The notification system according to claim 15, wherein
the brake-related information includes information related to an actuation state of the electric drive unit.

* * * * *